Sept. 10, 1940.  J. NEUFELD  2,214,342
POSITION FINDING
Filed June 12, 1937   2 Sheets-Sheet 2

INVENTOR
Jacob Neufeld

Patented Sept. 10, 1940

2,214,342

UNITED STATES PATENT OFFICE 2,214,342

POSITION FINDING

Jacob Neufeld, Tulsa, Okla.

Application June 12, 1937, Serial No. 147,997

14 Cliams. (Cl. 250—11)

My invention relates to a radio positioning method and mechanism.

An object of my invention is to provide a method for detecting visually the position of moving bodies such as ships or airplanes located in a given geographical region.

A further object of my invention is to provide means whereby a given coast line can be satisfactorily surveyed and protected during the time of war, by giving a continuous and visual indication of all the enemy ships navigating near the shore.

A further object of my invention is to provide means for a simultaneous, continuous, and visual indication of all enemy airplanes flying over a given territory.

A still further object of my invention is to produce a permanent record of the course of ships and airplanes located in a given geographical region. Thus a plane forced down in wild country or at sea may be quickly found. An aviator approaching a mountain range may be made aware of the fact and may choose his altitude accordingly even though the mountains can not be seen, or a ship navigating by "dead reckoning" may be constantly informed of its true position and may be safely guided to its harbor.

In one of the embodiments of my invention I am accomplishing these objects by providing an apparatus by means of which any radio signals sent out by ships or airplanes may be picked up by two directional receiving stations, each receiving station having apparatus automatically operable in response to incoming radio signals to indicate the direction from which said signals are received, together with apparatus for combining said indications at a central point to form an indication of the exact position of all the sources of the said signals.

The novel features which I believe to be characteristic of my invention are set forth with particularity in the appended claims. My invention, itself, however, both as to its organization and method of operation, together with further objects and advantages thereof, will be better understood by reference to the following description taken in connection with the accompanying drawings in which:

Figure 1:
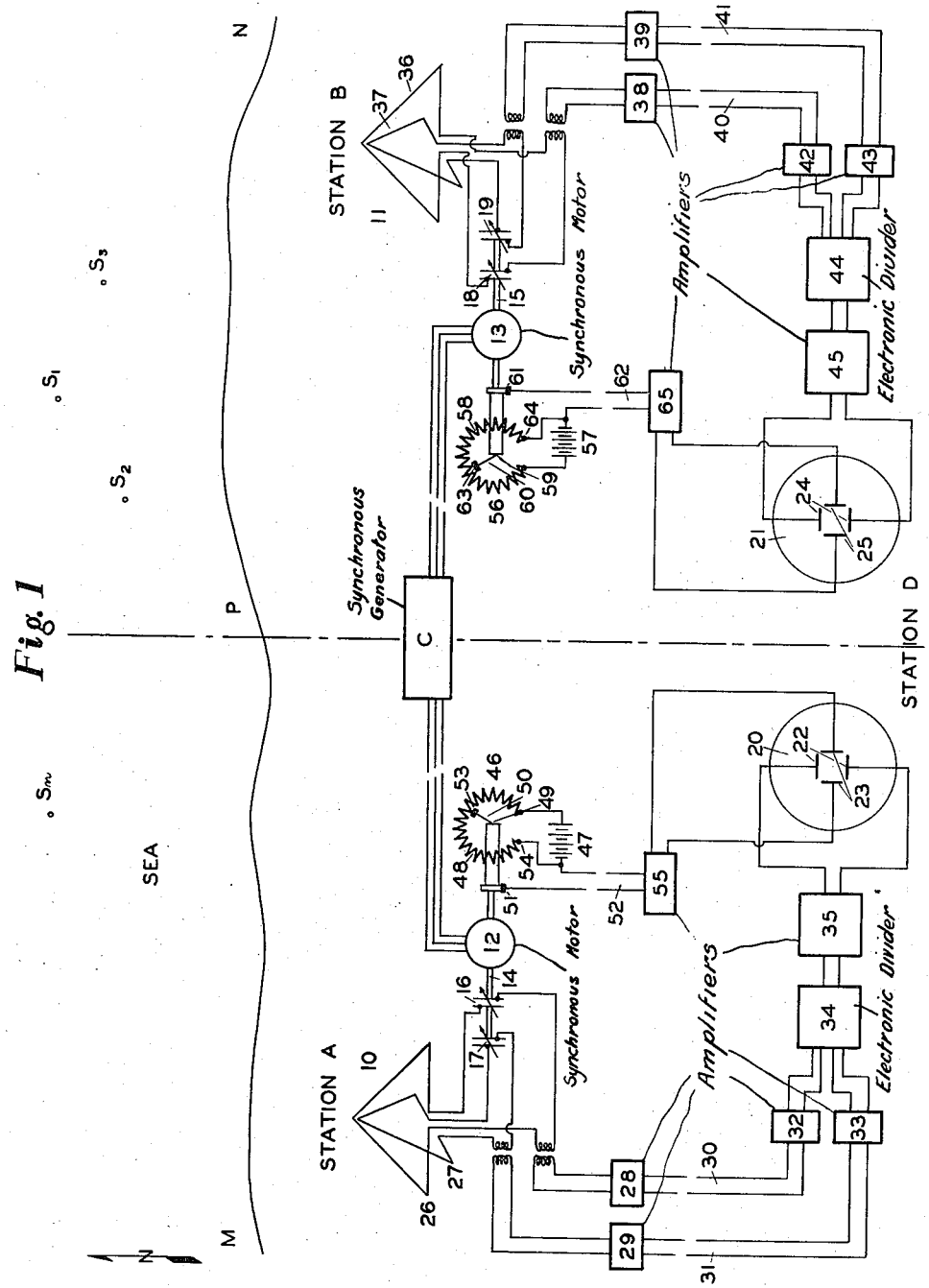
Figure 1 represents one embodiment of my invention.

Referring now more particularly to Figure 1 the symbols $S_1$, $S_2$, ... $S_n$ designate enemy ships located near the coast MPN; A and B designate two radio receiving stations having their aerial systems 10 and 11 spaced apart to ensure satisfaction of the trigonometric conditions for good position fixing; C designates a low frequency generator energizing synchronous motors 12 and 13, the said motors being located at the stations A and B respectively. The motors 12 and 13 are on the same shaft 14 and 15 with tuning condensers 16, 17 and 18, 19 respectively, the said tuning condensers being in continuous rotation so as to cover periodically in succession a certain predetermined tuning frequency range of the aerials 10 and 11. The radio receiving stations A and B are adapted to transmit automatically and continuously the bearings of the ships $S_1$, $S_2$, ... $S_n$ to a station D. The station D contains two cathode ray oscillographs 20 and 21 in which the cathode ray beams indicate on screens, spots representing positions of the vessels $S_1$, $S_2$, ... $S_n$.

In such a manner, an observer in charge of the coastal defense and located at the station D is constantly aware of the number and exact position of the enemy ships approaching the sea shore.

In the operation of the device it is assumed that the ships $S_1$, $S_2$, ... $S_n$ are provided with radio-transmitting stations transmitting signals at frequencies $f_1$, $f_2$, ... $f_n$ respectively.

The arrow N shown in the figure indicates the direction of the true north; $\alpha_1$, $\alpha_2$, ... $\alpha_n$ are the bearings east of the true north of the ships $S_1$, $S_2$, ... $S_n$ resp. as taken by the station A, and $\beta_1$, $\beta_2$, ... $\beta_n$, are the bearings west of the true north of the ships $S_1$, $S_2$, ... $S_n$ resp. as taken by the station B.

The condensers 16 and 17 and the condensers 18 and 19 are in a continuous rotation and enable the tuning range of aerials 10 and 11 respectively to cover a predetermined frequency band within a relatively short time interval. The said tuning conditions repeat themselves periodically in succession in such a manner that the aerials 10 and 11 are repeatedly tuned at determined instants to the frequencies $f_1$, $f_2$, ... $f_n$ of signals transmitted from the ships $S_1$, $S_2$, ... $S_n$ respectively.

Thus the stations A and B are repeatedly and successively exposed to signals from the ships $S_1, S_2, \ldots S_n$. By means which shall be explained hereafter the station A is made to produce automatically the bearings $\alpha_1, \alpha_2, \ldots \alpha_n$ from the respective signals received from the ships $S_1, S_2, \ldots S_n$. In the same manner the station B is made to produce automatically the bearings $\beta_1, \beta_2, \ldots \beta_n$ from the respective signals received from the ships. These bearings are transmitted simultaneously with their respective frequencies $f_1, f_2, \ldots f_n$ from the stations A and B to the station D.

Thus the station A is made to transmit to the station D continually and in a very rapid succession electrical signals representing the values $\alpha_1, f$ in the following cyclic order $$\alpha_1, f_1;\ \alpha_2, f_2;\ \alpha_3, f_3;\ \ldots \alpha_n, f_n;\ \alpha_1, f_1;\ \alpha_2, f_2;\ \ldots$$

In a similar manner the station B is made to transmit automatically to the station D the signals $$\beta_1, f_1;\ \beta_2, f_2;\ \beta_3, f_3;\ \ldots \beta_n\ f_n;\ \beta_1, f_1;\ \beta_2\ f_2;\ \ldots$$

The cathode ray tubes 20 and 21 in the observing station D are of a standard construction, the tube 20 being provided with two pairs of deflecting electrodes 22 and 23 respectively, and the tube 21 being provided with two pairs of deflecting electrodes 24 and 25 respectively.

The signals $\alpha_1, \alpha_2, \ldots \alpha_n$ transmitted by the station A, are translated into electrical voltages which are applied successively across the electrodes 22 of the cathode ray tube 20. Also, the voltages representing the values $f_1, f_2, \ldots f_n$ are applied successively across the electrodes 23 and in such a manner that the voltage $\alpha_1$ coincides exactly in time with the voltage $f_1$, the voltage $\alpha_2$ coincides with $f_2$, etc.

It is well known to those skilled in the art that the electron beam in a cathode ray tube produces on the screen a luminous spot, the position of which is determined by the voltages $\alpha$ and $f$ applied to the deflecting electrodes 22 and 23 respectively.

Thus at the instant at which these voltages have the values $\alpha_1, f_1$, resp., the luminous spot will be deflected horizontally by the value $f_1$ and deflected vertically by the value $\alpha_1$.

It is therefore apparent that in the present arrangement the luminous spot will occupy the positions determined by $$\alpha_1, f_1;\ \alpha_2, f_2;\ \ldots \alpha_n, f_n;\ \alpha_1, f_1;\ \ldots$$

in a very rapid and cyclic succession. By employing on the screen of the cathode ray oscillograph a fluorescent material possessing an appreciable period of after-glow, the existence of the spots corresponding to the above positions can be made apparently or in reality simultaneous. Thus the presence and location of ships $S_1, S_2, \ldots S_n$ is indicated visually on the screen of the cathode ray tube 20 by points the abscissas of which are $f_1, f_2, \ldots f_n$ and the ordinates $\alpha_1, \alpha_2, \ldots \alpha_n$.

In a similar manner the signals $$\beta_1, f_1;\ \beta_2, f_2;\ \ldots \beta_n, f_n;\ \beta_1, f_1;\ \text{etc.},$$

transmitted from the stations B to D will indicate visually on the screen of the cathode ray tube 21 the presence of ships $S_1, S_2, \ldots S_n$ by luminous points the abscissas of which are $f_1, f_2, \ldots f_n$ and the ordinates are $\beta_1, \beta_2, \ldots \beta_n$.

In such a manner the observer in charge of the coastal survey and located at the station D is aware of all the enemy ships in the neighborhood of the shore at any particular instant. It is apparent that a permanent record of the locations and paths of the ships may be provided by continuously projecting the indications of the cathode ray tubes 20 and 21 on a photographic plate or film.

Now various elements entering in the arrangement of Figure 1 will be explained more in detail.

The aerial 10 consists of two directional antennae consisting of loops 26, 27 respectively, and having their planes intersecting each other. The loops 26, 27 may be symmetrical and adjusted to produce the well known figure-in-eight pattern, or they may be asymmetrical and characterized by a vertical effect (by asymmetrical ground or otherwise) and adjusted to produce cardioid patterns. The tuning condensers 16 and 17 of the antennae 26 and 27 are set in a continual rotatory motion on a common shaft 14 being driven by the synchronous motor 12. The two antennae are inductively coupled to amplifiers 28, 29 respectively, the said amplifiers having a constant and equal input output relationship over a wide range of input frequencies. The amplifiers 28, 29 are connected to the respective transmission lines 30, 31. These transmission lines serve as a link connecting the radio receiving station A with the observing station D. At the observing station D the lines 30, 31 are connected through the amplifiers 32, 33 to an electronic dividing arrangement 34. The electronic dividing arrangement consists of a mechanism adapted to produce an electrical effect which represents the quotient of two other electrical effects. In this particular case the voltage appearing across the output terminals of the electronic divider 34 represents the voltage received from the amplifier 32 divided by the voltage received from the amplifier 33.

The output voltage of the electronic divider 34 is amplified in 35 and applied across the deflecting electrodes 22 of the cathode ray tube 20.

Figure 4:
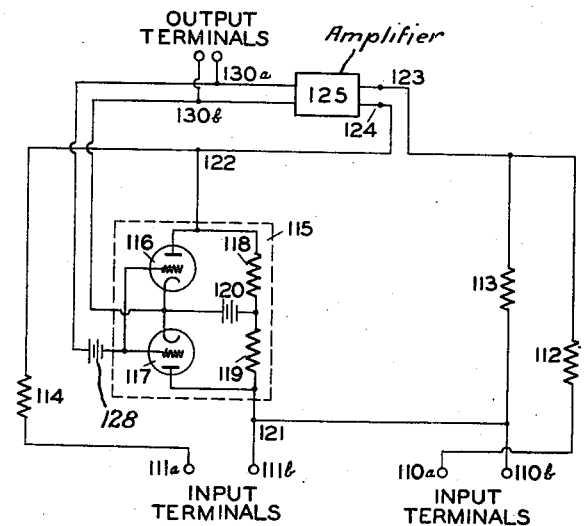
Figure 4 represents an electronic divider which constitutes an element of the arrangement of Figure 1 and Figure 2.

The structural details and the operation of the electronic dividing arrangement shall be explained hereafter in connection with Figure 4.

In a similar manner the radio receiving station B is provided with two loop antennae 36 and 37, the tuning of which is effected by means of variable condensers 18 and 19 the said condensers being rotated by the shaft 15 of the synchronous motor 13. The output of the antennae 36 and 37 is amplified in 38, 39 and subsequently transmitted through the lines 40 and 41 to the observing station D. At the observing station the lines 40, 41 are connected through the amplifiers 42, 43 to an electronic dividing arrangement 44 similar to the one designated by 34. The output voltage of the electronic dividing arrangement is amplified in 45 and applied across the electrodes 24 of the cathode ray tube 21.

Referring now again to the station A, a potentiometric arrangement 46 is provided, which consists of a battery 47 delivering current through the resistor 48 and of an electrically conductive arm 50 mounted on the rotating shaft 14. The point 49 of the arm 50 is electrically connected through a portion of the shaft 14 and the brush 51 to one of the transmission lines 52. On the other hand the point 53 of the arm 50 during the rotation of the shaft slides continually on the resistor 48 and is always electrically connected to the other transmission line 52 through a portion of the resistor 48 between the points 53 and 54. It is apparent that the voltage across the lines 52 is equal to the voltage drop across the portion of the resistor 48 between the points 53 and 54. This voltage drop depends upon the instantaneous position of the arm 50. On the other hand, it is known that the instantaneous position of the arm 50 determines the value of the tuning condensers 16, 17 and consequently the frequency $f$ to which the aerial 10 is tuned at the given instant. In such a manner the potentiometric arrangement 46 is capable of delivering a voltage across the lines 52, the said voltage determining at any instant the corresponding frequency to which the aerial is tuned. This frequency determining voltage is subsequently transmitted across the lines 52 to the station D, wherein it is amplified in the amplifier 55 and applied across the deflecting electrodes 23 of the cathode ray tube 20.

In a similar manner in the station B a potentiometric arrangement 56 is provided which is adapted to deliver a voltage across the lines 62, the said voltage determining at any instant the corresponding frequency to which the aerial 11 is tuned. This frequency determining voltage is subsequently transmitted across the lines 62 to the station D wherein it is amplified in the amplifier 65 and applied across the deflecting electrodes 25 of the cathode ray tube 21.

Consider now an extremely short instant at which the aerial 10 is tuned to the frequency $f_1$ of the signal sent by the ship $S_1$. Let at this instant the ship be located on a line bisecting the planes of antennae 26 and 27. It will be apparent that the relative positions of $S_1$ with respect to both antennas are similar one to another and consequently the amount of energy received from the transmitter of the ship $S_1$ will be the same for antenna 26 as for antenna 27. Then the amplifiers 28 and 29 respectively connected to the antennas 26 and 27 will consequently deliver equal voltages to the transmission lines 30 and 31 respectively. These voltages will be amplified again at 32, 33, applied to the electronic divider 34 and will cause the electronic divider to produce across its output terminals the voltage corresponding to the ratio one. The voltage derived from the electronic divider 34 will be subsequently amplified in 35 and applied across the deflecting electrodes 22 of the cathode ray tube. Thus the luminous spot on the screen of the tube will be deflected by a determined amount and this deflection will be maintained as long as the vessel will be positioned on the referred line making an angle $\alpha_1$ with the direction of the north.

If however the vessel changes its angular relationship there is an increase in responsiveness in one of the antennas of the aerial 10 and a corresponding decrease in the other antenna. In that connection it is important to note that the ratio of responsiveness of the two antennas remains constant for any given value of $\alpha_1$ irrespective from the signal strength and distance from the vessel to the station. Consequently the voltage applied across the electrodes 22 of the tube 20 which represents the value of the said ratio and determines the vertical deflection of the luminous spot will represent at the same time the value $\alpha_1$ corresponding to the angular position of the vessel.

On the other hand, at the instant under consideration the rotating arm 50 mounted on the shaft 14 will occupy a certain instantaneous position. Then, across the lines 52 there appears a voltage, the magnitude of which represents the instantaneous position of the shaft 14 and consequently represents also the frequency $f_1$ to which the aerial 10 is tuned at the instant under consideration. It is therefore apparent that the voltage applied to the electrodes 23 at the particular instant under consideration represents the frequency $f_1$ of the signal emitted by the ship $S_1$. Consequently the luminous spot will be deflected horizontally by an amount $f_1$.

In a similar manner the luminous spot of the cathode ray tube 21 will be deflected vertically by an amount representing $\beta_1$ and horizontally by an amount representing $f_1$.

Thus the coordinates $\alpha_1, f_1$ of the luminous spot in the tube 20 together with the coordinates $\beta_1, f_1$ in the tube 21 determine definitely the position of the vessel $S_1$ with respect to the station A and B.

In considering the operation of the device it should be remembered now that the motors 12 and 13 are in a continuous rotatory motion and cause a continuous and periodic change in the tuning conditions of the aerials 10 and 11 so that the latter become successively, and repeatedly exposed to the frequencies $f_1, f_2, \ldots f_n$. To each of these frequencies corresponds a determined spot in the tubes 20 and 21. By making the succession of the referred to frequencies sufficiently rapid and by employing on the screens of the cathode ray oscillographs a fluorescent material, possessing an appreciable period of afterglow, the existence of these spots can be made apparently or in reality simultaneous.

It is therefore apparent that I have provided a system for indicating continuously on the tubes 20, 21 the position of the vessels $S_1, S_2, S_3, \ldots S_n$.

The arrangements so far described will give in the case of a ship, all the information required. In the case of aircraft, a substantially similar arrangement may be used in which the aerial arrays should preferably be of the Adcock type which are substantially free from aeroplane effect. Where there are employed closed coil aerials operating on radiation from the aircraft which is substantially vertically polarized, the projection of the position of the aircraft on the ground plane will be correctly represented, otherwise the position of the aircraft as represented will be subject to "aeroplane effect".

Figure 2:
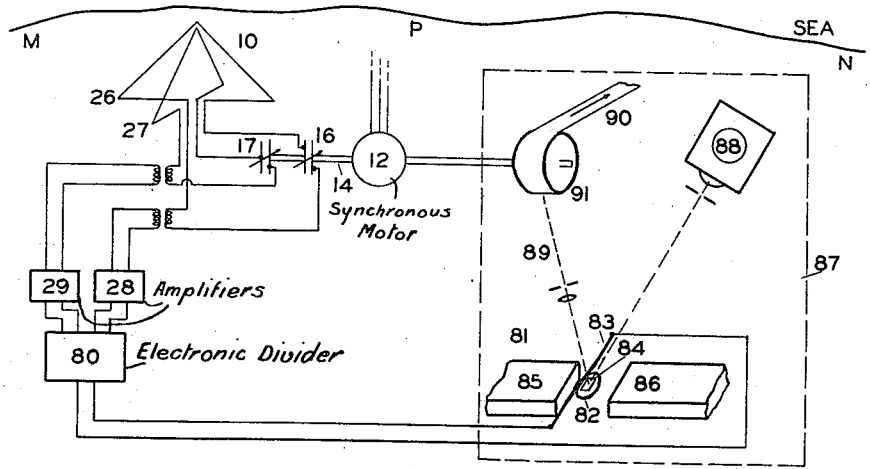
Figure 2 represents another embodiment of my invention.

Fig. 2 shows another embodiment of my invention which consists in producing records of the values $\alpha_1, f_1; \alpha_2, f_2; \ldots \alpha_n, f_n;$ and of the values $\beta_1, f_1; \beta_2, f_2; \ldots \beta_n, f_n;$ separately and independently at the stations A and B respectively. This recording may be done photographically and by comparing the records obtained at the station A with those of the station B the presence of the enemy ships may be detected and their positions determined.

Referring again to Fig. 2 there is represented an arrangement included in the station A. It is understood however that the station B is substantially similar to A. In this figure, 26, 27 designate the directive antennae of the aerial 10, 16 and 17 are the respective tuning condensers mounted on the shaft 14 and driven by the motor 12, 28 and 29 are the amplifiers amplifying the respective outputs of the antennas 26, 27 and 80 designates an electronic divider producing a voltage which represents the ratio of signals derived from the amplifiers 28 and 29 respectively.

The condensers 16 and 17 driven by the motor 12 are in a continuous rotation thus enabling the antennas 26, 27 to cover a predetermined tuning range periodically in succession. In a manner which has been explained above the electronic voltage divider 80 produces across its output terminals the values $\alpha_1, \alpha_2, \ldots \alpha_n,$ periodically in succession. These values are subsequently transmitted to a moving coil galvanometer 81 which includes a coil 82 supported by suspension fiber 83 and carrying a mirror 84. The coil 82 is adapted to swing in a uniform field in the air gap between the pole pieces 85 and 86 of a permanent magnet. The galvanometer and its associated parts are housed in a recorder device which is included in the dotted rectangle 87 in the figure. It is to be understood, of course that any suitable recording device may be employed, one example, however being described so that my invention will be more easily understood. A source of light 88 is adapted to focus a point of light upon the mirror 84 which reflects the point of light along the path 89 to a photographic film 90 which is stretched in the path of reflected beam. The film is adapted to move in the direction of the arrow that is to be wound by the spool 91 which is driven by the motor 12. A number of different forms of recording instruments may be used, as will be readily understood by those skilled in the art.

It will now be observed that the current delivered by the voltage divider 80 and varying in intensity in accordance with the signals $\alpha_1, \alpha_2, \ldots \alpha_n$ will pass through the coil 82 and will cause a deflection of the coil and of the attached mirror, the magnitude of the said deflection being proportional to instantaneous values of the current. This is indicated by the beam of light, reflected from the mirror on the film 90. At the same time the film 90 moves in such manner that at any instant the position of the film depends upon the angular displacement of the motor 12, which in turn determines the value of the condensers 16, 17 and consequently the frequency $f$.

Figure 3:
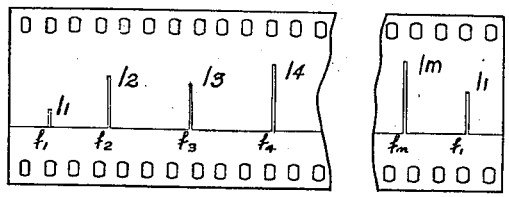
Figure 3 represents a photographic record obtained by means of the arrangement shown in Figure 2.

It will be therefore apparent that the records obtained will be substantially as shown in Fig. 3. Fig. 3 shows a strip of film obtained by means of this arrangement. The respective points along the longitudinal axis of the film represent various frequencies $f_1, f_2, \ldots f_n, f_1, f_2 \ldots f_n, f_1 \ldots$ and the corresponding transversal lines such as $l_1, l_2, \ldots l_n, l_1 \ldots l_n, l_1 \ldots$ represent the bearings $\alpha_1, \alpha_2, \ldots \alpha_n, \alpha_1 \ldots$ A similar film is provided by the station B which gives the values $\beta_1, \beta_2, \ldots \beta_n$ and the corresponding frequencies $f_1, f_2, \ldots f_n$. By comparing the referred to two films, the presence of the enemy vessels may be detected and their positions determined.

It is therefore apparent that I have accomplished the objects of my invention.

Consider now the electronic divider designated by blocks 34, 44 in Fig. 1 and by block 80 in Fig. 2. Either of blocks, 34, 44, 80 represents a transducer provided with two pairs of input terminals and one pair of output terminals and adapted to produce across the output terminals a voltage representing the ratio of the input terminals. In order to understand better my invention, I am including hereafter a diagram of an electronic divider, shown in Fig. 4 and some explanatory remarks referring to Fig. 4.

It is understood that my invention refers to an arrangement substantially as shown in Figs. 1-3, and that Fig. 4 refers only to one of the elements of Fig. 1 and Fig. 2, and namely to the electronic divider. The electronic divider contitutes the subject matter of U. S. Patent 2,129,880 granted to Serge A. Scherbatskoy and Jacob Neufeld on September 13, 1938.

Briefly, in Fig. 4 numerals 110a, 110b and 111a, 111b designate two pairs of input terminals and the numerals 130a, 130b designate the output terminals of an electronic divider. As stated above, an electronic divider is adapted to produce across its output terminals a voltage, representing substantially the ratio of voltages, applied respectively across the input terminals 110a, 110b and 111a, 111b. The input terminals 110a, 110b are connected to a circuit consisting of a resistance 112 in series with a resistance 113. The input terminals 111a, 111b are connected to a circuit consisting of a resistance 114 in series with a circuit arrangement designated by a block 115, the said circuit arrangement comprising two three electrode tubes 116 and 117 connected in push-pull, two resistors 118, 119 connected across the anodes of the tubes 116, 117 respectively, and a battery 120 inserted between the cathodes of the tubes 116, 117 and the common terminal of the resistors 118, 119 respectively. The terminal 121 of 115 is connected directly to one of the terminals of 113 while the other terminal of 113 and the terminal 122 of 115 are respectively connected to the input terminals 123, 124 of a D. C. amplifier 125. The D. C. amplifier 125 is of a push-pull type well known in the art. One of the output terminals of the amplifier 125 is connetced to the cathodes of the tubes 116, 117 and the other output terminal of 125 is connected through the battery 128 to the grids of the tubes 116, 117.

The operation of this arrangement can be explained as follows:

Let R designate the resistance of 112 or 114, these two resistances being equal one to another and let $r_1$ designate the resistance of 113. The electric circuit contained in the block 115 and inserted between the terminals 121, 122 acts primarily as a resistance; let the latter be represented by $r_2$. It is apparent that the value of $r_2$ depends among other things upon the plate-cathode resistances of the tubes 116 and 117. On the other hand, the plate cathode resistances of the tubes 116, 117 are functions of their grid biases, the latter being determined by the voltage between the terminals 130a, 130b.

Consequently the voltage between the terminals 130a, 130b can be used for controlling the equivalent resistance $r_2$ of the block 115, and the magnitude of this voltage determines the value of the resistance $r_2$.

The current flowing from the terminal 110a into the resistor 112 in series with the resistor 113 and returning to the terminal 110b can be expressed as follows:

$$i_1 = \frac{E_1}{R + r_1} \quad (1)$$

Assuming that $r_1 \ll R$ the expression (1) reduces to $$i_1 = \frac{E_1}{R} \quad (2)$$

and the voltage across the terminals of the resistance 113 can be expressed as follows:

$$v_1 = i_1 r_1 = \frac{E_1 r_1}{R} \quad (3)$$

In a similar manner, the current flowing from the terminal 111a into the resistor 114 and traversing the block 115 from the terminal 122 to the terminal 121 and entering into the terminal 111b can be expressed as follows:

$$i_2 = \frac{E_2}{R + r_2} \quad (4)$$

Assuming that $r_2 << R$ the expression (4) reduces to $$i_2 = \frac{E_2}{R} \quad (5)$$

and the voltage across the terminals 122 and 121 becomes $$v_2 = i_2 r_2 = \frac{E_2 r_2}{R} \quad (6)$$

The voltages $v_1$ and $v_2$ oppose each other in such a manner that the voltage $v_3$ across the input terminals 123, 124 of the D. C. amplifier 125 is equal to the difference of $v_1$ and $v_2$, i. e., $$v_3 = v_1 - v_2 = \frac{1}{R}[E_1 r_1 - E_2 r_2] \quad (7)$$

and the amplified voltage across the output terminals 130a, 130b of the D. C. amplifier is $$v_4 = K v_3 = \frac{K}{R}[E_1 r_1 - E_2 r_2] \quad (8)$$

where K is an amplification factor.

The voltage $v_4$ in series with the voltage of the battery 128 constitutes the grid bias of the tubes 116, 117. It is apparent that $v_4$ determines the plate resistance of the tubes and also determines the resistance $r_2$ of the block 115. Under the conditions shown in the figure the value of $r_2$ is such as to render the expression $$v_3 = \frac{1}{R}[E_1 r_1 - E_2 r_2] \quad (9)$$

very small, i. e., $$v_3 << \frac{E_1 r_1}{R}$$

and $$v_3 << \frac{E_2 r_2}{R}$$

Assume that the expression (9) is zero, i. e., $$\frac{1}{R}[E_1 r_1 - E_2 r_2] = 0 \quad (10)$$

whence $$r_2 = \frac{E_1}{E_2} r_1 \quad (11)$$

Let $r_1$ be equal to one ohm. Then $$r_2 = \frac{E_1}{E_2} \quad (12)$$

It is thus seen from the formula (12) that the magnitude of the resistance $r_2$ numerically expresses the ratio of the voltages $E_1$ and $E_2$. Consequently the problem of determining the ratio of voltages across the terminals 110a, 110b and 111a, 111b is equivalent to determining $r_2$, i. e., the equivalent resistance of the block 115 between the terminals 121 and 122. On the other hand the value of $r_2$ is controlled and determined by the voltage $v_4$ across the output terminals 130a, 130b. Consequently in the expression (12) instead of measuring the value $r_2$ expressing the ratio $E_1/E_2$ it is sufficient to determine the voltage $v_4$ which corresponds to the given value of $r_2$, the said voltage $v_4$ being measured across the output terminals 130a, 130b.

If now the relative values of the voltages $E_1$ and $E_2$ change, the voltage across the output terminals 130a, 130b will indicate a new value of the ratio $E_1/E_2$ and, in general, in case of varying input voltages the voltage across the output terminals 130a, 130b will indicate automatically and continuously the instantaneous value of their ratio.

Assume for instance that the voltage $E_2$ increases and the voltage $E_1$ is maintained constant. Then the current $i_2$ and the voltage $v_2$ will also increase, and will cause a corresponding variation of the voltage $v_3$. Then the amplified voltage $v_4$ derived from the output terminals of 125 changes its value in such a manner as to cause a decrease of the resistance $r_2$ of the block 115. Then the voltage drop $v_2$ across the resistor $r_2$ becomes again substantially equal to the voltage drop $v_1$ across the resistor $r_1$ so that the relation (10) is substantially satisfied. It should be noted, however, that in this case the resistance $r_2$ has a different and a smaller value which corresponds to a new and a smaller value of the $E_1/E_2$. To this new value of $r_2$ corresponds the new value of $v_4$ which is directly indicated by the voltage across the output terminals 130a, 130b.

It is therefore apparent that the electrical circuit, substantially as shown and described in connection with Fig. 4 operates as an electronic divider and may be substituted in place of blocks 34, 44 in Fig. 1 and in place of block 80 in Fig. 2.

In view of my invention and disclosure, variations and modifications to meet individual whim or particular need will doubtless become evident to others skilled in the art, to obtain part or all of the benefits of my invention without copying the structure shown, and I, therefore claim all such in so far as they fall within the reasonable spirit and scope of my invention:

I claim:

1. Method of determining directions of stations radiating electromagnetic waves which includes receiving the said waves, producing signals representing directions of the said waves, producing signals the magnitudes of which represent individually frequencies of the said waves, and producing a compound indication of the said direction representing and the said frequency representing signals.

2. In an apparatus for determining direction of radio waves a direction finder for producing signals indicating directions of radio waves when tuned to the frequency of the said waves, a light source projecting a beam of light upon a light sensitive element, a single means for moving the light sensitive element and for simultaneously varying the tuning of the direction finder, means responsive to the said signals for controlling the beam of light in order to produce upon the light sensitive element spots representing directions of the said transmitting stations.

3. An apparatus for determining angles of incidence of radiant energy emanating from a plurality of mobile sources of radiations, the said sources being located on ships, planes or the like, comprising two antennas, at least one of the said antennas having directional characteristics, means for changing continuously the tuning of the said antennas in a manner as to cover a predetermined frequency range within which the said radiation sources are located and for repeating periodically in succession the said tuning conditions thus receiving successively and repeatedly the signals emanating from the said sources, means responsive to signals received by the said two antennas for producing a signal representing substantially ratios of the magnitudes of the signals received by the said two antennas, means for producing signals identifying the said sources and means for indicating the said ratios together with the said source identifying signals.

4. An arrangement for recording directions of radio waves comprising a directional antenna for receiving the said waves and producing signals representing directional components of the said waves at the point of reception, means responsive to the said components for producing indications representing directions of the said waves, means for producing indications identifying the said waves and means for combining the said indications in form of a diagram.

5. An arrangement for recordng directions of radio waves comprising a directional antenna for receiving the said waves and producing signals representing directional components of the said waves at the point of reception, means responsive to the said components for producing indications representing directions of the said waves, means for producing indications representing frequencies of the said waves and means for combining the said indications in form of a diagram.

6. In a method of determining directions of radio waves having different frequencies, the step of producing a beam of light, the step of successively receiving said waves at time intervals characteristic of the frequency spacing between the said waves, and the step of deflecting the said beam in response to the said waves by an amount related to the directions of the said waves.

7. In a method of recording on a limited portion of a surface directions of radio waves having different frequencies, the step of producing a beam of light, the step of receiving said waves and the step of deflecting the said beam in response to the said waves by an amount related to the directions of the said waves and the step of recording the said deflections at determined positions on the said surface, the said positions representing frequencies of the said waves.

8. In a method of recording on a limited portion of a surface directions of radio waves having different frequencies, the step of producing a beam of light, the step of successively receiving said waves at time intervals characteristic of the frequency spacing between the said waves, the step of deflecting the said beam in response to the said waves by an amount related to the directions of the said waves, and the step of recording the said deflections at determined positions on the said surface, the said positions representing frequencies of the said waves.

9. In a method of determining directions of radio transmitting waves having different frequencies the step of receiving the said waves at time intervals characteristic of the frequency spacing between the said waves, the step of producing a beam of light, the step of deflecting the said beam of light in response to the reception of the said waves to the amount related to the said directions and the step of repeating continually and periodically the said deflecting.

10. In a system for recording directions of incoming waves, the said waves having different frequencies, a receiving station for continually and repeatedly receiving said waves and for producing continually and repeatedly signals representing directions of the said waves, a light sensitive element, a light source projecting a beam of light upon the light sensitive element, means responsive to the said signals for controlling the said beam of light in order to produce on the light sensitive element spots representing directions of the said waves, and means for spacing the said spots on the light sensitive element at intervals characteristic of frequency spacing between the said waves.

11. In an arrangement for recording directions from which radio signals are received a radio receiving station having directional receiving apparatus and producing indications of directions from which radio signals are received, the said station comprising a tuning element, a recorder responsive to the said indications for recording and identifying the said directions, a single means for varying said tuning element and for simultaneously operating the said recorder.

12. In an arrangement for recording directions from which radio waves are received, means for receiving said waves and for producing signals, the magnitude of each of the said signals representing individually the direction of a corresponding wave, the said means comprising a tuning element, means for varying said tuning element, a recorder operated in a definite time relation to the said varying means and responsive to the said signals for recording and identifying the said directions.

13. In a system for recording directions of incoming waves having different frequencies, a receiving station for receiving the said waves at time intervals characteristic of the frequency spacing between the said waves, a light sensitive element, a light source projecting a beam of light upon the light sensitive element, means responsive to the output of the said receiving station for deflecting the said beam by an amount related to the directions of the said waves.

14. In a system for recording directions of incoming waves having different frequencies, a light sensitive element, a light source projecting a beam of light upon the light sensitive element, means for continually and repeatedly receiving the said waves at time intervals characteristic of the frequency spacing between the said waves and for continually and repeatedly deflecting the said beam by an amount related to the directions of the said waves.

JACOB NEUFELD.